UNITED STATES PATENT OFFICE.

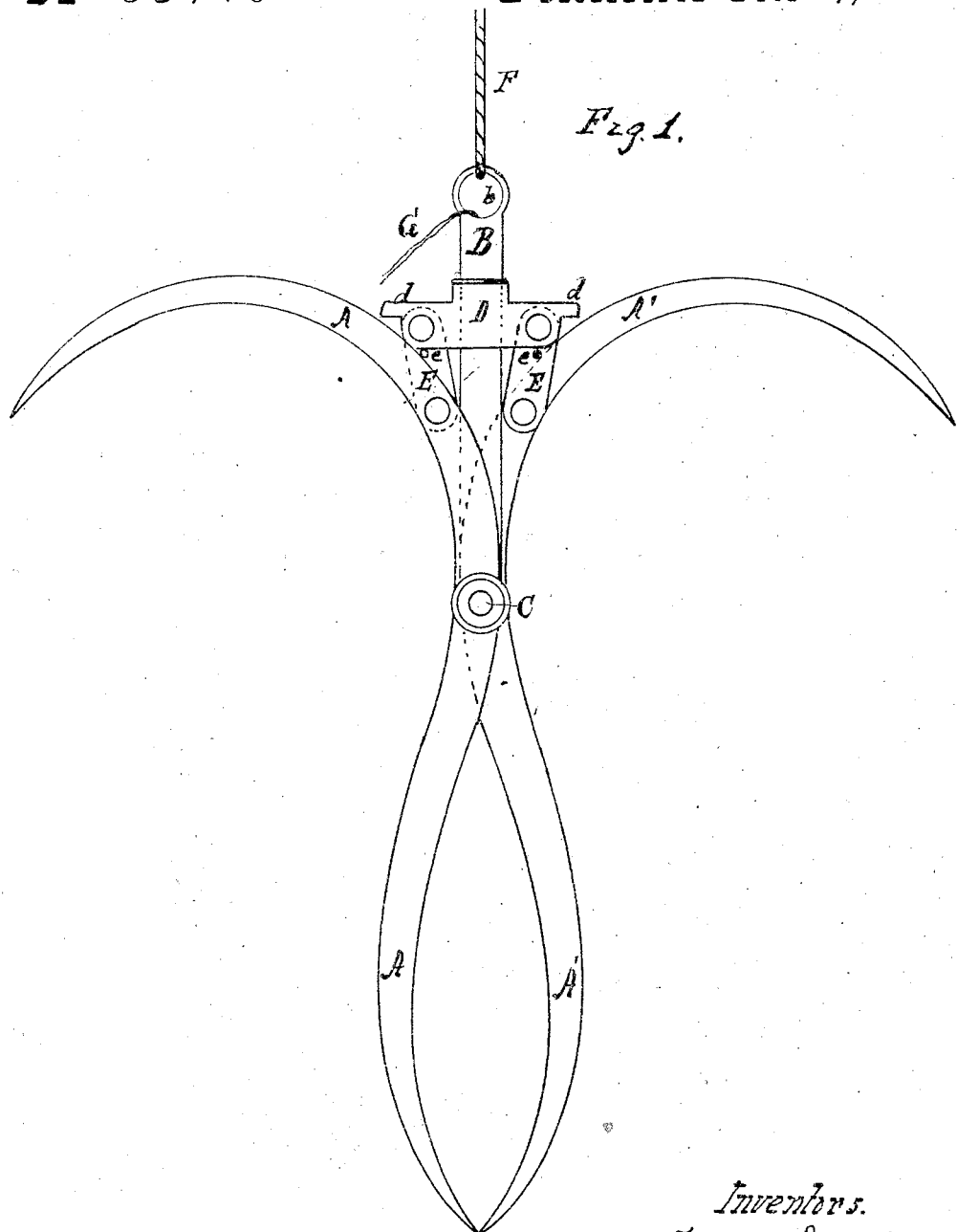

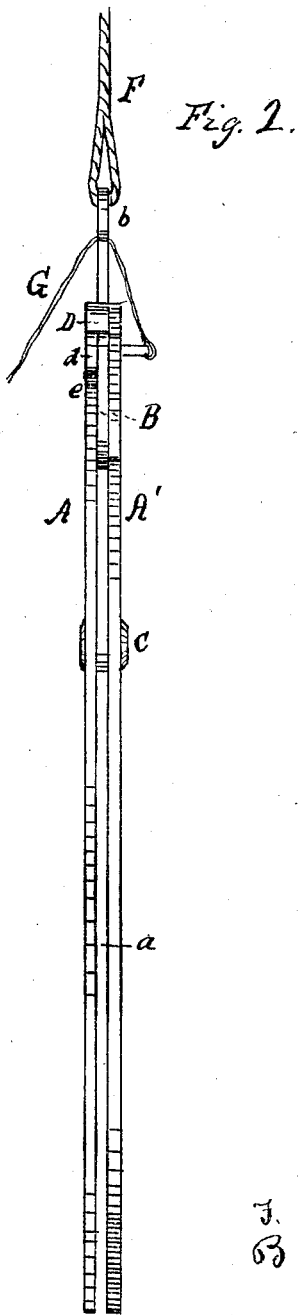

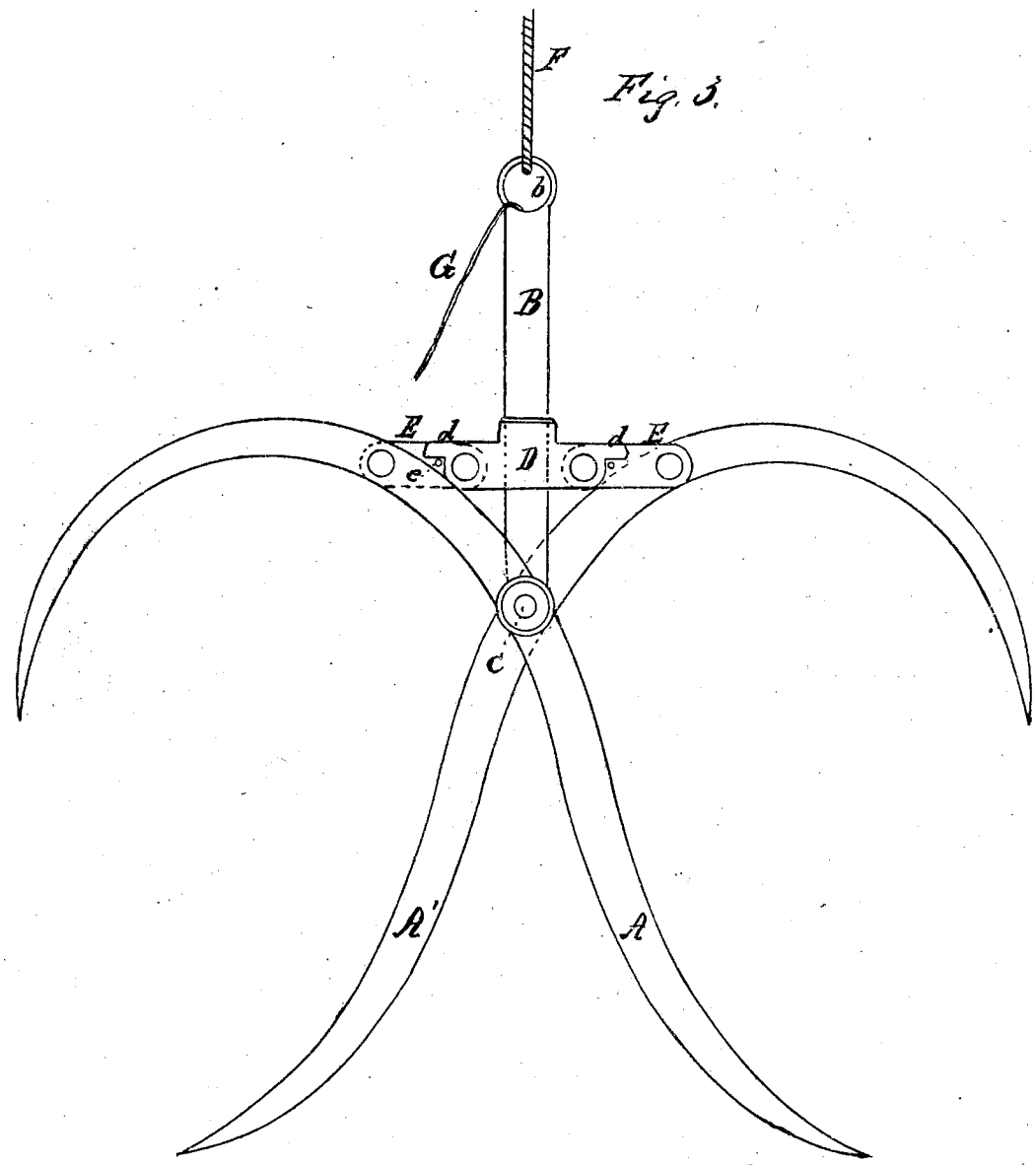

F. NISHWITZ, OF WILLIAMSBURG, N. Y., AND B. S. HYERS, OF PEKIN, ILL.

IMPROVEMENT IN HORSE HAY-FORKS.

Specification forming part of Letters Patent No. 56,440, dated July 17, 1866.

*To all whom it may concern:*

Be it known that we, FREDERICK NISHWITZ, of Williamsburg, in the county of Kings and State of New York, and BENJAMIN S. HYERS, of Pekin, in the county of Tazewell and State of Illinois, have invented a new and useful Improvement in Horse Hay-Forks, of which the following is a full, clear, and exact description, reference being had to the accompanying drawings, which make part of this specification, and in which—

Figure 1 represents a front view of our improved fork with its parts in the position they occupy when entering the hay. Fig. 2 represents an edge view of the same; and Fig. 3 represents a front view with the parts in the position they occupy when holding and lifting the hay.

The improvement herein claimed consists, first, in combining two S-shaped prongs or tines, pivoted near their centers so as to move concentrically in opposite directions but in planes parallel to each other, and having their four arms so arranged that the two lower arms converge and form a spear to penetrate the hay, while the two upper arms are at the same time raised out of the way, and when the lower arms are expanded the upper arms also diverge and descend to grasp the hay between them, respectively, and the corresponding lower arm on each side; second, in pivoting the tines to opposite sides of a shank or draw-bar, whereby a space is left between the lower tines for the escape of hay, which would otherwise clog the fork; third, in pivoting the tines at their center to the lower end of the shank or draw-bar and connecting them at a point above the pivot with a sliding link on the shank by means of a toggle-joint provided with self-locking stops, which prevent the tines from yielding when the load is lifted; fourth, in so combining the tines, the shank, and the toggle-link that the toggle shall act as a stop to prevent the points of the tines from moving the wrong way while penetrating the hay.

In the accompanying drawings, the tines A A' are pivoted to opposite sides of a shank, B, by a bolt or pin, C, so as to allow them to oscillate freely in opposite directions but in parallel planes, and leave a space, $a$, between them, as shown in Fig. 2.

A loop or collar, D, slides freely on the shank B, and is connected to the upper arms of the tines by links E, pivoted both to the collar and to the tines, so as to swing freely vertically, the links, it will be observed, being so pivoted to the sides of the tines respectively as to be in the same plane with the shank. By this means, when the fork is being forced into the hay the links bear against the shank and prevent the points of the tines from moving the wrong way. Pins $e$ are inserted into the links, and project on one side so as to strike against shoulders $d$ on the collar D when the hay is grasped, and to act as stops to prevent the further spreading or grasping of the tines and also to prevent the toggle from flexing while the bundle is being lifted.

The fork is worked by the usual draw-rope F, attached to a loop, $b$, in the shank, and by a trip-cord, G, attached to the collar D, and also passing through the loop $b$.

In operation, the lower arms or tines, being in the position shown in Figs. 1 and 2, are thrust into the hay to the depth required, and while entering are gradually forced apart and across each other by the pressure of the hay on the sides of the spear, which causes the lower tines to spread out until the four arms assume the position shown in Fig. 3, drawing down the collar and links until the toggles are straight, when the hay is grasped (in two separate bundles) between the upper arm of one tine and the lower arm of the other. The pins $e$ fit into the corners of the shoulders $d$, and act as stops to prevent the further flexure of the toggles either upward or downward, and thus secure the grasp of the arms upon the hay. The bundles are lifted in the usual way, and discharged by drawing on the trip-cord G, which pulls the loop D up on the shank, flexing the toggles and permitting the tines to resume the position shown in Fig. 1, when the hay falls.

What we claim as our invention, and desire to secure by Letters Patent, is—

1. The combination, in a horse hay-fork, of two S-shaped prongs or tines, pivoted near their centers to move in parallel planes, when so arranged that when entering the hay the lower arms of the tines unite to form a spear to penetrate more easily, and when expanded the hay is grasped (in two separate bundles) between the lower arm of one prong and the upper arm of the other, respectively, substantially as described.

2. The arrangement of the tines, pivoted on opposite sides of the rigid shank or draw bar, as described, for the purpose of avoiding clogging.

3. The combination of the tines, pivoted to the shank, with the sliding collar, toggles, and stops, substantially as described, for the purpose of locking the tines when hoisting.

4. The combination, with the shank, the tines, and the sliding collar, of the toggle-links, when arranged to operate as a stop to limit the backward movement of the tines in entering the hay, substantially as described.

In testimony whereof we have hereunto subscribed our names.

F. NISHWITZ.
B. S. HYERS.

Witnesses:
HENRY A. LEE,
JACOB WERTZ.